(12) United States Patent
Bayer et al.

(10) Patent No.: US 6,863,237 B2
(45) Date of Patent: Mar. 8, 2005

(54) DEVICE FOR COILING UP A THREAD OR WIRE-TYPE OBJECT

(75) Inventors: Thomas Bayer, Igersheim (DE); Karl-Georg Melber, Weikersheim (DE)

(73) Assignee: Wittenstein AG, Igersheim (DE)

( * ) Notice: Subject to any disclaimer, the term of this patent is extended or adjusted under 35 U.S.C. 154(b) by 34 days.

(21) Appl. No.: 10/399,971

(22) PCT Filed: Oct. 8, 2001

(86) PCT No.: PCT/EP01/11592

§ 371 (c)(1),
(2), (4) Date: Jul. 23, 2003

(87) PCT Pub. No.: WO02/35562

PCT Pub. Date: May 2, 2002

(65) Prior Publication Data

US 2004/0026559 A1 Feb. 12, 2004

(30) Foreign Application Priority Data

Oct. 23, 2000 (DE) ......................... 100 52 546

(51) Int. Cl.$^7$ ............................................. B21C 47/14
(52) U.S. Cl. ...................................... 242/439.1; 29/605
(58) Field of Search ............................... 242/439, 439.1, 242/441, 448; 29/605

(56) References Cited

U.S. PATENT DOCUMENTS

| | | | | |
|---|---|---|---|---|
| 3,810,587 A | * | 5/1974 | Muskulus ................ | 242/437.3 |
| 4,177,555 A | * | 12/1979 | Weltman et al. ............... | 29/751 |
| 4,291,840 A | * | 9/1981 | Lenders .................... | 242/439.1 |
| 5,622,332 A | * | 4/1997 | Bennitt et al. .............. | 242/439 |

FOREIGN PATENT DOCUMENTS

| | | | | | |
|---|---|---|---|---|---|
| JP | 357095611 A | * | 6/1982 | .................. | 242/439 |
| JP | 358112445 A | * | 7/1983 | .................. | 242/441 |
| JP | 358201564 A | * | 11/1983 | .............. | 242/437.3 |
| JP | 361066550 A | * | 4/1986 | .................. | 242/448 |
| JP | 362122116 A | * | 6/1987 | .................. | 242/439 |
| JP | 362262636 A | * | 11/1987 | .............. | 242/439.1 |
| JP | 362272846 A | * | 11/1987 | .............. | 242/439.1 |
| JP | 363056907 A | * | 3/1988 | .................. | 242/443 |
| JP | 401007453 A | * | 1/1989 | .................. | 242/441 |

* cited by examiner

Primary Examiner—Emmanuel Marcelo
(74) Attorney, Agent, or Firm—Bachman & LaPointe, P.C.

(57) ABSTRACT

The invention relates to a device for coiling a thread or wire-type object (1) onto a winding jig (10) by means of a flyer (7) circling the winding jig (10). The object (1) is guided to the flyer (7) by a tube (2) and the flyer (7) is positioned on the tube (2) in rotating manner. Said winding jig (10) is coupled to a carrier sleeve (18) which is arranged approximately in the direction of the longitudinal axis (A) of the tube (2), at a distance (A) from the same, in order to pass the object (1). Said carrier sleeve (18) is associated with the fixed tube (2) in a fixed manner.

16 Claims, 4 Drawing Sheets

DEVICE FOR COILING UP A THREAD OR WIRE-TYPE OBJECT

BACKGROUND OF THE INVENTION

The invention relates to an apparatus for winding up a thread-like or wire-like article onto a jig by means of a flyer that circles around the jig, the article being guided to the flyer through a tube and the flyer being rotatably mounted on the tube.

In many branches of industry, a thread-like or wire-like article must be wound up onto a jig. For example, it may be a textile thread. However, the present invention relates primarily to winding wire onto a jig, for example to form a coil. For this purpose, it is known for the wire to be guided to a flyer, which circles around the jig and, in the process, is moved along the jig, in order that the wire is applied to the jig in turns. In this case, the jig itself has its own support arm, which in turn has to be designed in such a way that it does not disrupt the movement of the flyer. This is complicated and needs a relatively great deal of space.

The present invention is based on the object of providing a device of the aforementioned type in which the space required is minimized and the guidance of the article to the jig is improved.

SUMMARY OF THE INVENTION

In order to achieve this object, the jig is coupled to a support sleeve, which is arranged approximately in the direction of the longitudinal axis of the tube, but maintains a distance from the latter for the article to be led through, the support sleeve being fixed in position with respect to the stationary tube.

This means that no separate mounting is provided for the jig any more, instead the jig is fixed with respect to the tube. There is therefore no longer any disruptive support arm which runs in the region of the flyer.

Furthermore, the distance covered by the article as far as the jig is reduced to a minimum. The winding speed can therefore be increased. In addition, the wear on an apparatus of this type is minimized, since there are only masses which revolve centrally, so that no torque is produced, only tilting torques or only friction plus mass moment of inertia, so that only the bearings have to be viewed as wearing parts.

The coupling of the support sleeve to the tube is also important. In the preferred exemplary embodiment, this is effected via a rotary ring, which is coupled to the flyer and corotates with the latter. This rotary ring likewise runs around the tube and the support sleeve, but in each case in an eccentric region. This means that this rotary ring completes an outwardly directed movement approximately perpendicular to the longitudinal axis of the tube, but with a distance being maintained between the tube and support sleeve. This is effected by the respective eccentric regions both of the tube and of the support sleeve being bounded by a revolving ring.

In order to lead the wire-like article through, the rotary ring has at least one opening, which is preferably located in the vicinity of a feed arm of the flyer. In this case, the flyer is formed substantially by this feed arm and a rotary element, it being possible for the position of the feed arm with respect to the jig to be varied.

The rotary element runs around the tube and also the support sleeve and, in this case, is driven by a drive. For instance, the drive movement is transmitted via a toothed belt to an internal gear, which sits on the rotary element.

However, in order that the rotating rotary ring can move with respect to the rotary element of the flyer, transversely with respect to the longitudinal axis, a coupling is provided which permits this movement. In the case of this coupling, a number of possibilities is also conceivable, the intention being for these possibilities and also further possibilities to be covered by the idea of the invention.

In a simple exemplary embodiment, the coupling can be effected via resilient elements. These resilient elements can be arranged directly between rotary ring and rotary element or else loaded in lateral tension, so to speak in the form of shear.

Other force stores, in particular spring elements, are also conceivable, against which the rotary ring is supported, loaded endwise or in lateral tension.

Also conceivable is the arrangement of two magnetic rings lying one inside the other, which, given appropriate polarity, ensures a connection during the rotation of rotary ring and rotary element.

In a preferred exemplary embodiment, the rotary element is to form an annular channel, in which a tumbler flange projecting from the rotary ring engages. Here, a mechanical connection between the tumbler flange and an annular channel inner wall can be effected by appropriate sliding pieces which slide in radial grooves. However, the arrangement of the aforementioned resilient elements or force stores is also conceivable here.

Furthermore, there is the possibility of arranging a coupling disk, which has flexible arms, in the annular channel between the tumbler flange and the annular channel inner wall.

A coupling disk of this type is known under the name "Controlflex" and on the market.

Also conceivable is the arrangement of a known parallel link mechanism, which is also called a "Schmidt coupling".

A substantial advantage of the invention resides in the fact that, by means of the arrangement selected, no "wet mounting" of the rotatable elements has to be provided any more, instead that dry bearings can be selected.

Overall, the size of the entire apparatus can be reduced substantially, since the elements of the mounting of the jig are accommodated in the region of the tube or of the flyer.

Likewise, an increase in the speed of revolution is possible as a result of the simple configuration of the guide of the wire-like article to the jig.

BRIEF DESCRIPTION OF THE DRAWINGS

Further advantages, features and details of the invention emerge from the following description of preferred exemplary embodiments and by using the drawing wherein.

DETAILED DESCRIPTION

Figure 1:
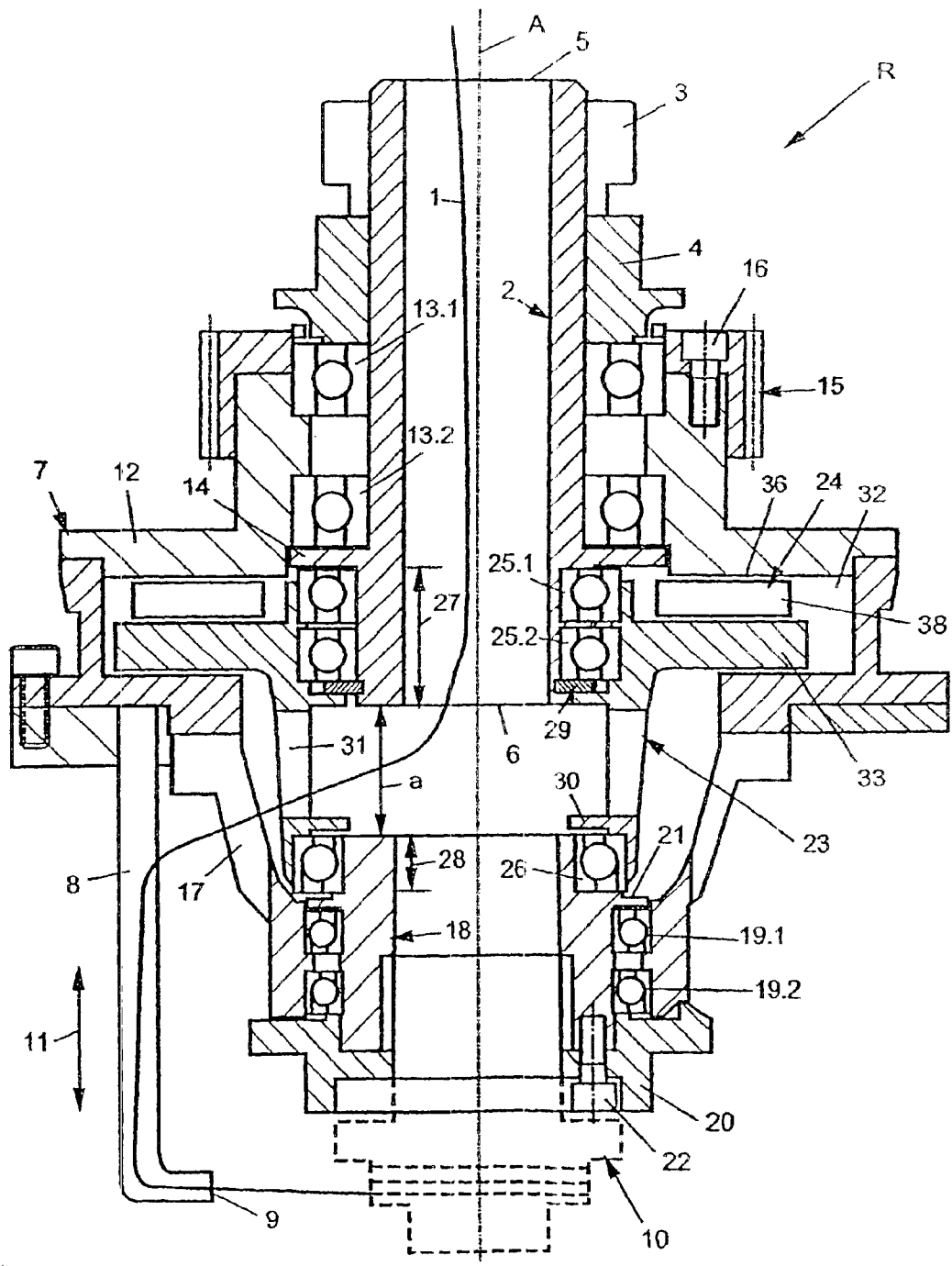
FIG. 1: shows a longitudinal section through an apparatus according to the invention for winding up a thread-like or wire-like article.

An apparatus R according to the invention for winding up a thread-like or wire-like article 1 has a tube 2 which has a longitudinal axis A. This tube 2 is fixed in position, for which purpose retaining clamps 3 and 4 are indicated.

The article 1 runs into the tube 2 at one end 5 and out of the tube 2 at its other end 6 and is then guided to a flyer 7, which has a feed arm 8. From an opening 9 in the feed arm 8, the article 1 is guided to a jig 10, indicated dashed, onto which the article 1 is wound in stages in the exemplary embodiment. In order that this takes place, the feed arm 8 or the opening 9 can be displaced with respect to the jig 10 along the double arrow 11, the corresponding displacement device not being shown here. However, it is commercially available and can be, for example, an appropriate spindle or the like.

The feed arm 8 is located on a rotary element 12 which, in the exemplary embodiment shown, is assembled from a plurality of parts which, for reasons of clarity, are not specifically illustrated. In any case, the rotary element 12 is supported with respect to the tube 2 via bearings 13.1 and 13.2 and, in this way, rotates around the stationary tube 2. These bearings are located between the retaining clamp 4 and a ring 14 projecting radially from the tube 2.

The rotation of the rotary element 12 is effected by an internal gear 15, which is connected to the rotary element 12 by a screw 16. The internal gear 15 is wrapped around, at least partly, by a toothed belt, which is not specifically shown and which in turn is connected to an appropriate drive.

In order to allow the thread-like or wire-like article 1 through, the rotary element 12 has an opening 17 close to the feed arm 8.

The jig 10 is detachably fixed to a support sleeve 18, which shares the longitudinal axis A with the tube 2. The rotary element 12 of the flyer 7 is in turn supported against this support sleeve 18 by two bearings 19.1 and 19.2, which ensure that the rotary element 12 also runs around the support sleeve 18. These bearings 19.1 and 19.2 are retained between a clamping ring 20 and a ring 21 which in turn projects radially from the support sleeve 18. In order to fix the clamping ring 20, a screw 22 is provided.

The support sleeve 18 maintains a distance a from the tube 2, the support sleeve 18 being fixed with respect to the tube 2 by a rotary ring 23. This rotary ring 23 is connected to the rotary element 12 via a coupling 24 described further below and rotates with the rotary element 12. Here, it is supported at one end with respect to the tube 2 by two bearings 25.1 and 25.2 and at the other end with respect to the support sleeve 18 by a bearing 26. In these regions, in which the bearings 25.1 and 25.2 and, respectively, 26 are supported with respect to the tube 2 and the support sleeve 18, the corresponding wall region 27 and 28 is eccentric or cam-shaped with respect to the longitudinal axis A. This means that the wall regions 27, 28 which lie diagonally opposite each other have a different wall thickness. As a result, the rotary ring 23 makes a tumbling movement or moves perpendicular to the longitudinal axis A. However, this also means at the same time that the support sleeve 18 is held in the position of the tube 2 and, since the tube 2 is fixed, likewise remains fixed.

The bearings 25.1 and 25.2 are caught between the ring 14 and a Seger ring 29. The bearing 26 is located between an inner ring 30 projecting from the rotary ring 23 and the ring 21 mentioned above.

Furthermore, at least one opening 31, through which the article 1 is guided, is also provided in the rotary ring 23. This opening 31 preferably corresponds with the opening 17 in the rotary element 12.

Figure 5:
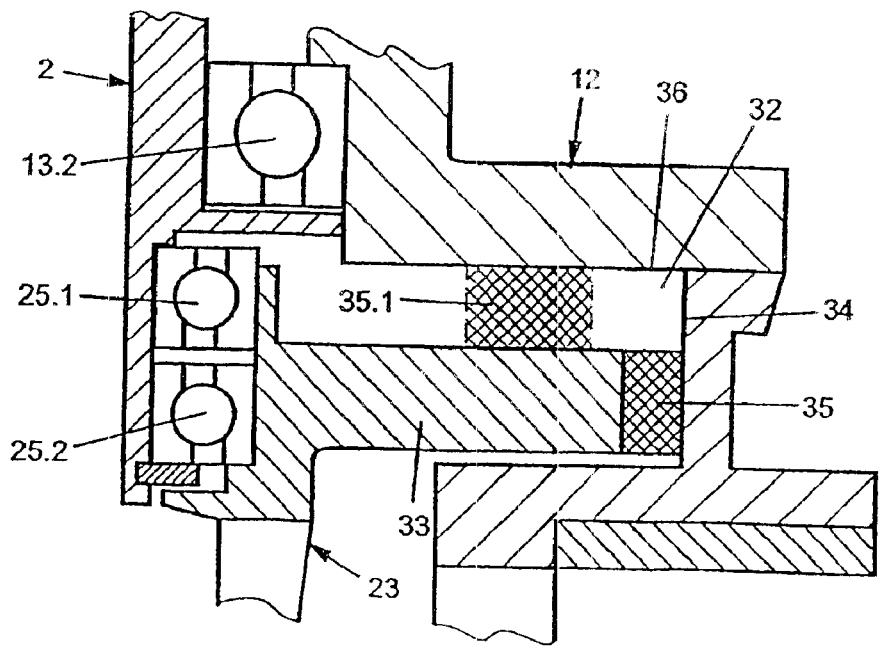
FIG. 5: shows an enlarged detail of a further exemplary embodiment of an apparatus according to the invention.

The coupling 24 must ensure that, during the common rotation of rotary ring 23 and rotary element 12, the rotary ring 23 can move radially with respect to the rotary element 12. In the exemplary embodiment shown in FIG. 1, the rotary element forms an annular channel 32, into which a tumbler flange 33 projects out from the rotary ring 23. This tumbler flange 33, as shown in FIG. 5, can then be supported against a base 34 of the annular channel 32 by a resilient element 35. For instance, this resilient element 35 can be a rubber ring.

Furthermore, a resilient element 35.1 could also be inserted laterally between the tumbler flange 33 and an annular channel wall 36, as indicated dashed.

Figure 6:
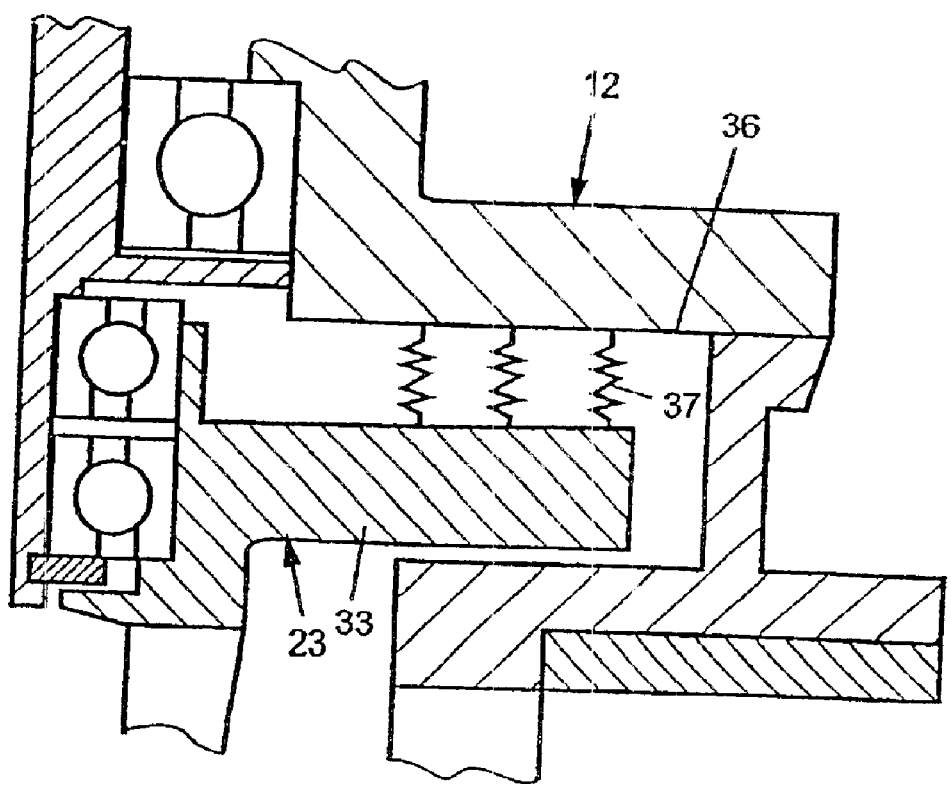
FIG. 6: shows an enlarged detail of a further exemplary embodiment of an apparatus according to the invention.

In another exemplary embodiment of the invention, according to FIG. 6, there are any desired force stores, for example springs 37, between the tumbler flange 33 and the annular channel wall 36.

In an exemplary embodiment not shown, consideration is given to arranging sliding pieces between the tumbler flange 33 and the annular channel wall 36, said sliding pieces being guided radially in grooves. This also ensures that, firstly, the rotary ring 23 is carried along during the rotation of the rotary element 12, but, secondly, that the transverse movement of the rotary ring 23 is not hampered.

Figure 4:
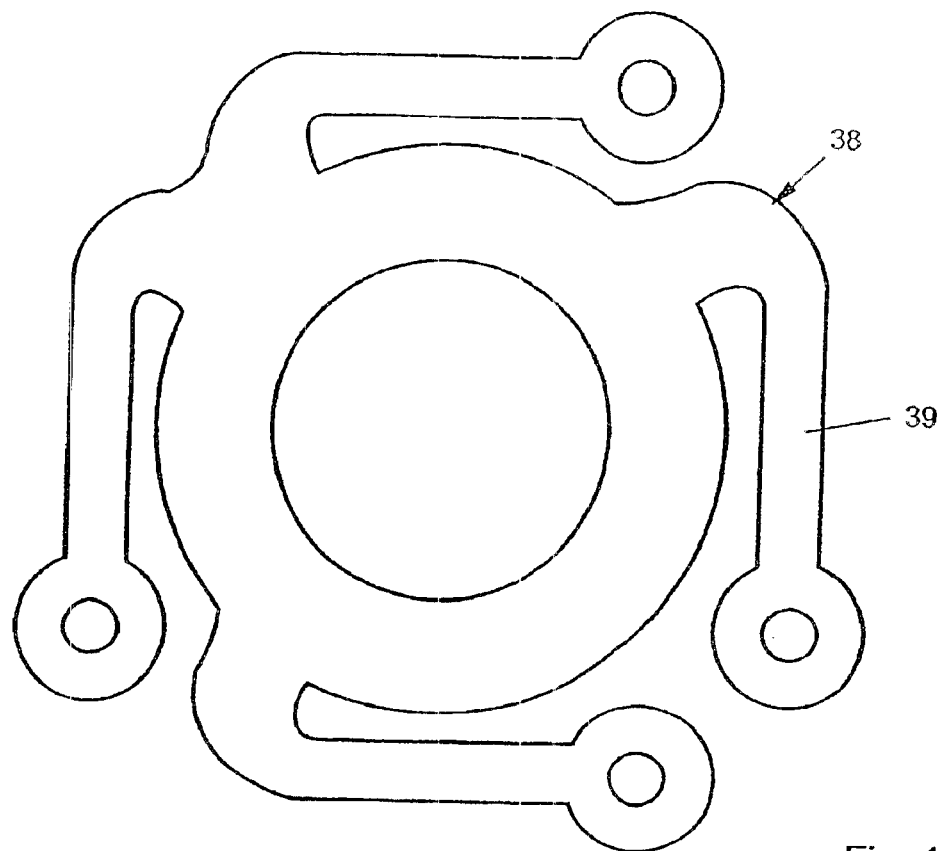
FIG. 4: shows a plan view of a coupling disk.

FIG. 1 indicates that, between the tumbler flange 33 and the annular channel wall 36, there is a disk 38, which is illustrated in more detail in FIG. 4. This disk 38 has flexible arms 39, which are connected firstly to the tumbler flange 33 and secondly to the annular channel wall 36. They also permit the aforementioned movement.

Figure 2:
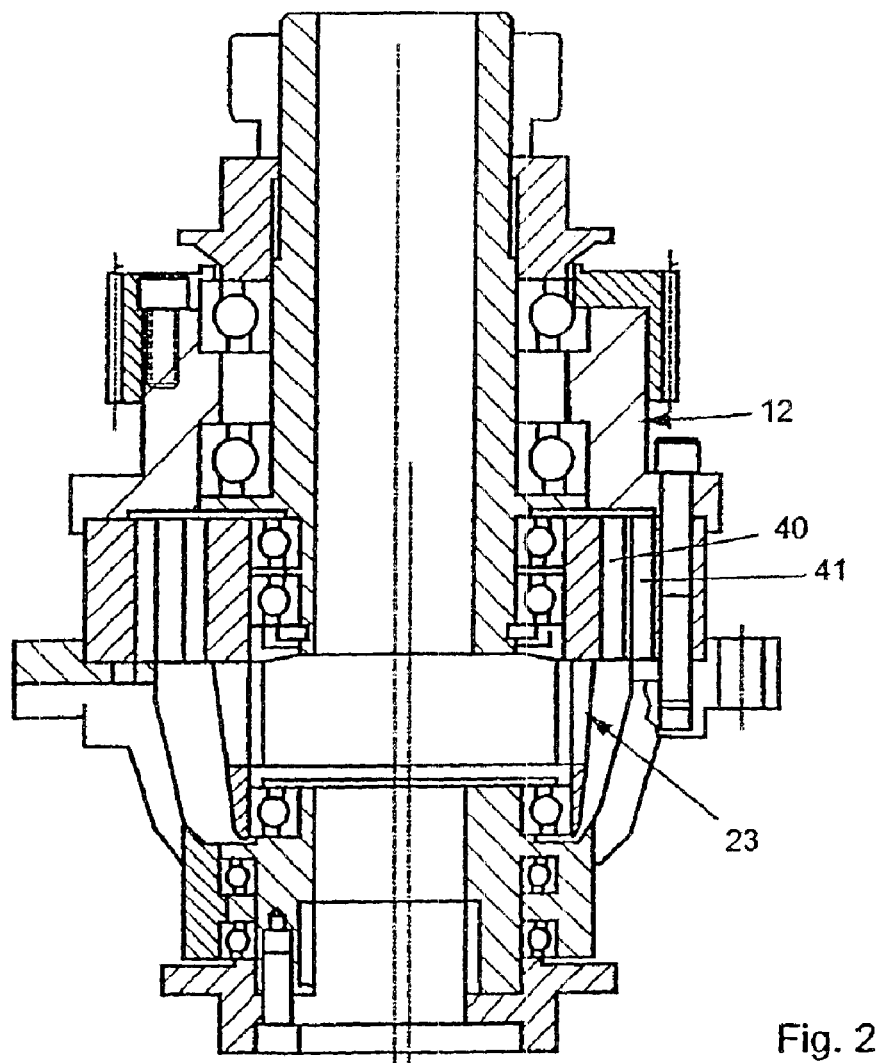
FIG. 2: shows a longitudinal section through a further exemplary embodiment of an apparatus according to the invention according to FIG. 1.
Figure 3:
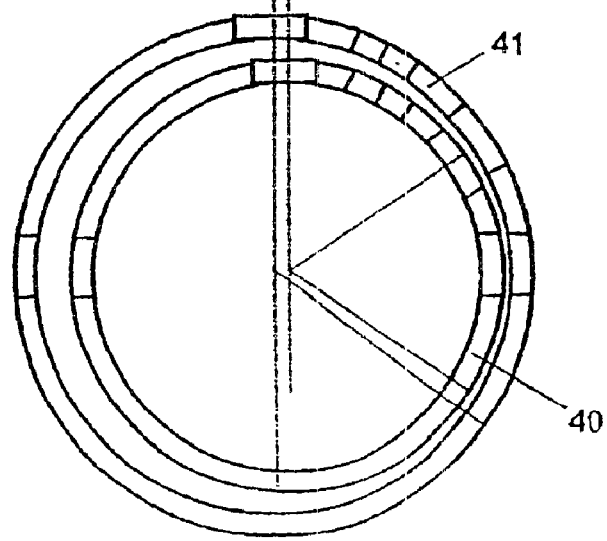
FIG. 3: shows a cross section through parts of the apparatus according to FIG. 2.

A further possible coupling between rotary element 12 and rotary ring 23 is indicated in FIGS. 2 and 3. In this case, it is a magnetic coupling. A magnetic ring 40 is fitted to the rotary ring 23 and interacts with a magnetic ring 41 in the rotary element 12. By means of an appropriate polarity change and a pole assignment, it is ensured that the two rings 40 and 41 do not rotate with respect to each other.

What is claimed is:

1. An apparatus for winding up an article (1) onto a jig (10) by means of a flyer (7) that circles around the jig (10), the article (1) being guided to the flyer (7) through a tube (2) and the flyer (7) being rotatably mounted on the tube (2), the improvement comprises the jig (10) is coupled to a support sleeve (18), which is arranged substantially in the direction of a longitudinal axis (A) of the tube (2) and at a distance (A) therefrom, the support sleeve (18) being fixed in position with respect to the stationary tube (2).

2. The apparatus as claimed in claim 1, wherein the support sleeve (18) is connected to the tube (2) by a rotary ring (23), which is coupled to the flyer (7) and corotates with the flyer.

3. The apparatus as claimed in claim 2, wherein the bearings (25.1, 25.2, 26) for the rotary ring (23) run on an eccentric region (27, 28) both on the tube (2) and on the support sleeve (18).

4. The apparatus as claimed in claim 3, wherein the eccentric regions (27, 28) of tube (2) and support sleeves (18) are bounded by a revolving ring (14, 21).

5. The apparatus as claimed in claim 2, wherein the rotary ring (23) has at least one opening (31) for the article (1) to be led through.

6. The apparatus as claimed in claim 5, wherein the flyer (7) has a rotary element (12), to which a feed arm (8) for the article (1) to the jig (10) is fixed.

7. The apparatus as claimed in claim 6, wherein the rotary element (12) is driven, by a toothed belt.

8. The apparatus as claimed in claim 7, wherein the rotary element (12) is a supported with respect to the tube (2) and with respect to the support sleeve (18) by bearings (13.1, 13.2, 19.1, 19.2).

9. The apparatus as claimed in claim 8, wherein the rotary element (12) enters into a coupling (24) with the rotary ring (23), which permits movement of the rotary ring (23) in the radial direction.

10. The apparatus as claimed in claim 9, wherein the coupling is effected via resilient element (35, 35.1).

11. The apparatus as claimed in claim 9, wherein the coupling (24) is effected via spring elements.

12. The apparatus as claimed in claim 9, wherein the rotary element (12) forms an annular channel (32), in which a tumbler flange (33) projecting from the rotary ring (23) engages.

13. The apparatus as claimed in claim 12, wherein sliding pieces, which slide in radial grooves, are arranged between tumbler flange (33) and rotary element (12).

14. The apparatus as claimed in claim 12, wherein a coupling disk (38) with flexible arms (39) is arranged between the tumbler flange (33) and the rotary element (12).

15. The apparatus as claimed in claim 12, wherein a parallel link mechanism is arranged between the tumbler flange (33) and the rotary element (12).

16. The apparatus as claimed in claim 9, wherein the rotary element (12) and the rotary ring (23) are coupled magnetically.

* * * * *